United States Patent [19]

Fuchs et al.

[11] 3,901,841

[45] Aug. 26, 1975

[54] VINYL ACETATE-FUMARIC ACID MIXED DIESTER COPOLYMER DISPERSION PAINT COMPOSITION

[75] Inventors: Gundolf Fuchs, Rehkamp; Dietrich Pirck, Fasanenstieg, both of Germany; Orville W. Rigdon, Groves, Tex.

[73] Assignee: Deutsche Texaco Aktiengesellschaft, Hamburg, Germany

[22] Filed: July 5, 1973

[21] Appl. No.: 376,502

[52] U.S. Cl. .................. 260/29.6 T; 260/29.6 TA; 260/29.6 WA; 260/78.5 B
[51] Int. Cl. ............................................. C08f 45/24
[58] Field of Search...... 260/29.6 T, 29.6 R, 78.5 B, 260/29.6 H

[56] References Cited
UNITED STATES PATENTS 3,314,908  4/1967  Kagan et al. .................. 260/29.6 T
3,423,352  1/1969  Levine et al. .................. 260/29.6 T
3,720,636  3/1973  Wollner et al. ................ 260/29.6 T Primary Examiner—Harold D. Anderson
Attorney, Agent, or Firm—T. H. Whaley; C. G. Ries; Henry W. Archer

[57] ABSTRACT

Disclosed is a dispersion paint composition prepared by emulsion copolymerization of a monomer mixture consisting essentially of from 20 to 60 weight percent of vinyl acetate and at least 40 to 80 weight percent of a fumaric acid diester from the group of a. at least one fumaric acid diester of an aliphatic alcohol with from 2 to 8 carbon atoms and at least one fumaric acid diester of an ether alcohol having from 2 to 8 carbon atoms;
b. a mixed diester of an aliphatic alcohol with from 2 to 8 carbon atoms and an ether alcohol having from 2 to 8 carbon atoms; and
c. a mixture of (a) and (b).

2 Claims, No Drawings

VINYL ACETATE-FUMARIC ACID MIXED DIESTER COPOLYMER DISPERSION PAINT COMPOSITION

The present invention relates to dispersion paint compositions for the production of hard and especially glossy coatings based on vinyl acetate-fumaric acid diester copolymers.

U.S. Pat. No. 3,720,636 filed in the name of the Applicant herein discloses dispersion paints, the film-forming lacquer component of which is a copolymer produced by reacting a major portion of fumaric acid diesters and minor amounts of vinyl aromatic hydrocarbon, and, optionally, of olefin. These dispersion paints provide coatings which distinguish themselves from the known ones by improved weather resistance, dirt-repellency, light-resistance, and resistance to yellowing.

U.S. Pat. No. 3,563,944 describes a process according to which vinyl acetate and fumaric acid esters may be emulsion copolymerized to dispersions of a high solids content. Those copolymers containing fumaric acid esters in an amount of up to a maximum of 30 percent are especially suitable for paints. Their film-forming temperature is relatively low, and the lacquers obtained therefrom have good abrasion resistance.

German Patent Application DT-AS 1,093,558 describes the production of dispersions of vinyl acetate copolymers which may contain, among others, up to 40 weight percent of dialkyl fumarates or maleinates. Good freeze stability is indicated as an advantage of such dispersions. The dispersions, however, give neither glossy nor hard and abrasion-resistant films.

The lacquer films obtained with the known dispersion paints containing fumaric acid diester copolymers are, with respect to their mechanical properties, equivalent to the lacquer films obtained with other known dispersion paints but are less expensive. However, lacquer films of acrylate resins are superior to those of the aforementioned prior art dispersion paints.

The present invention provides a dispersion paint composition which forms coatings having especially high polish and hardness. The lacquer films are equivalent to those obtained by using the expensive acrylate resins. The copolymers have a great capacity to absorb pigments so that they may be used at the same time for the production of highly filled flat finish dispersions. Dispersion paints having a high pigment content are known to give dull coatings. The present invention also provides a process for producing said dispersion paint composition.

The dispersion paint composition according to the present invention comprises a mixture of vinyl acetate and more than 40 weight percent of fumaric acid esters, the ester groups of which are at least partly ether alcohol groups. Preferably, a fumaric acid ester having butoxyethyl groups as the ether alcohol groups is used. Unexpectedly, it has been found in accord with the invention that vinyl acetate-fumaric acid ester dispersions result in films of the desired quality when the proportion of fumaric acid esters is more than 40 weight percent, preferably more than 60 weight percent, and when at least a portion of the alcohol components of said fumaric acid esters are residues of monoethers of aliphatic alcohols with monoglycols or oligoglycols. Preferably, the "ether alcohol" component of the fumaric acid ester is the monobutyl ether of ethyleneglycol. The content of said alcohol component preferably should not be below 8 mole percent based on the charged fumaric acid esters.

The process for producing the dispersion paint according to the invention comprises the copolymerisation of the monomer mixture mentioned above in an aqueous emulsion in the presence of at least one emulsifier, optionally, in the presence of a stabilizer and a free radical catalyst.

The reaction of the monomers is the more complete, the more nearly the mole ratio of vinyl acetate to fumaric acid esters approaches the value of 1 : 1. Accordingly, a monomer mixture of about 25 parts by weight of vinyl acetate, about 25 parts by weight of dibutoxyethyl fumarate, and 50 parts by weight of diisopropyl fumarate gives an especially good dispersion.

Unexpectedly, the introduction of the ether alcohol component gives not only a plasticising effect but, also, an emulsifying effect as well as increases the capacity to take up pigments.

The emulsifying effect is evidenced by the fact that in the polymerization reaction mixture with ether alcohol as the ester component, only 1 weight percent of an anionic emulsifier needs to be added, which is an exceptionally small amount for such polymerization. The lower the amount of emulsifier used, the lower the water sensitivity of the coating.

The incorporation of the ether alcohol component into the polymer may be done by copolymerizing vinyl acetate with a fumaric acid diester of aliphatic alcohols, preferably secondary aliphatic alcohols, and with the fumaric acid diester of ether alcohols. However, also mixed esters of an aliphatic alcohol, preferably a secondary alcohol, and an ether alcohol, or mixtures of the said diester of aliphatic alcohols, the said mixed ester, and the said diester having ether alcohol groups, may be used for the copolymerization with vinyl acetate. Such mixtures are obtained, for instance, by transesterification of fumaric acid diesters with ether alcohols as well as by esterification with mixtures of aliphatic and ether alcohols. As it is technically more convenient to produce mixed ester/diester mixtures from maleic acid anhydride and the alcohol components, costs are minimized by employing such mixtures. The content of ether alcohol groups per se in the polymer affects the quality of the emulsion.

In a preferred embodiment of the process of the invention, a non-ionic emulsifier is added to the aqueous phase, in addition to the above mentioned anionic emulsifier, in order to polymerize without a stabilizer or a protective colloid (in general, polyvinyl alcohol). With this "auxiliary"-combination, the proportion of the anionic emulsifier can be reduced to as low as 0.5 weight percent. Despite the absence of the stabilizer, neither the course of the polymerization itself, nor the useful life and the shear strength of the dispersion obtained are affected. The advantages of this embodiment include the especially high polish of the films and the lowered film-forming temperature. The hardness of the films is not the maximum, but is, nevertheless, within the range of commercial specification for dispersion paints.

The reaction is carried out at atmospheric pressure although other pressure levels may be employed.

The temperature employed is preferably as low as possible but in the range of from 70° to 90°C. The pH value of the aqueous phase shall not be lower than 4.

The invention and the advantages thereof are presented in the following examples. Examples 1 to 7 are specific embodiments of the process of the invention, Examples 8 to 10 are comparative examples according to the prior art.

In Examples 1 to 9, polymerization was accomplished as follows:

The aqueous phase (water with emulsifier, stabilizers, and one half of the amount of the peroxide catalyst) was heated under vigorous stirring with 25 parts by weight of monomer mixture to a temperature of 80°C. After reaching the reaction temperature, the remaining 75 parts by weight of monomer mixture (within 1 hour) and the other half of the catalyst as a concentrated aqueous solution (within 5 hours) were added thereto. The total time at reaction temperature amounted to 20 hours. Thereafter, the reaction mixture was cooled.

EXAMPLE 1

| aqueous phase | parts by weight | organic phase | parts by weight |
|---|---|---|---|
| $H_2O$ | 102.6 | vinyl acetate | 20 |
| Na-dodecyl sulfate | 1.0 | dibutoxyethyl fumarate | 10 |
| $K_2S_2O_8$ | 0.5 | diisopropyl fumarate | 70 |
| $NaHCO_3$ | 0.12 | | |
| polyvinyl alcohol | 1.0 | | |

EXAMPLE 2 — Mole ratio of vinyl acetate to fumaric acid ester ~1:1

| aqueous phase | parts by weight | organic phase | parts by weight |
|---|---|---|---|
| $H_2O$ | 103.0 | vinyl acetate | 25 |
| Na-dodecyl sulfate | 1.0 | dibutoxyethyl fumarate | 24 |
| $K_2S_2O_8$ | 0.5 | diisopropyl fumarate | 51 |
| polyvinyl alcohol | 1.0 | | |
| $NaHCO_3$ | 0.8 | | |

EXAMPLE 3 (using anionic and non-ionic emulsifier, without protective colloid) The example shows the advantage of the absence of a stabilizer or a protective colloid.

| aqueous phase | parts by weight | organic phase | parts by weight |
|---|---|---|---|
| $H_2O$ | 103.8 | vinyl acetate | 25 |
| Na-dodecyl sulfate | 0.5 | dibutoxyethyl fumarate | 24 |
| $K_2S_2O_8$ | 0.5 | diisopropyl fumarate | 51 |
| $NaHCO_3$ | 0.8 | | |
| non-ionic emulsifier ("EMULAN P"*) | 2.0 | | |

* )ethoxylated $C_{12}$ alcohol; from 3 to 5 mole of ethylene oxide per mole of alcohol.

EXAMPLE 4

| aqueous phase | parts by weight | organic phase | parts by weight |
|---|---|---|---|
| $H_2O$ | 103.0 | vinyl acetate | 25 |
| Na-dodecyl sulfate | 1.0 | dibutoxyethyl fumarate | 6.1 |
| $K_2S_2O_8$ | 0.5 | isopropylbutoxyethyl fumarate | 29.3 |
| $NaHCO_3$ | 0.8 | diisopropyl fumarate | 39.6 |
| polyvinyl alcohol | 1.0 | | |

EXAMPLE 5

| aqueous phase | parts by weight | organic phase | parts by weight |
|---|---|---|---|
| $H_2O$ | 103.0 | vinyl acetate | 25 |
| Na-dodecyl sulfate | 1.0 | diglycolbutyl-ether fumarate | 20 |
| $K_2S_2O_8$ | 0.5 | diisopropyl fumarate | 55 |
| $NaHCO_3$ | 0.8 | | |
| polyvinyl alcohol | 1.0 | | |

EXAMPLE 6

| aqueous phase | parts by weight | organic phase | parts by weight |
|---|---|---|---|
| $H_2O$ | 103.0 | vinyl acetate | 25 |
| Na-dodecyl sulfate | 1.0 | diethoxyethyl fumarate | 23 |
| $K_2S_2O_8$ | 0.5 | diisopropyl fumarate | 52 |
| $NaHCO_3$ | 0.8 | | |
| polyvinyl alcohol | 1.0 | | |

EXAMPLE 7

| aqueous phase | parts by weight | organic phase | parts by weight |
|---|---|---|---|
| $H_2O$ | 102.6 | vinyl acetate | 20 |
| Na-dodecyl sulfate | 1.0 | dibutoxyethyl fumarate | 20 |
| $K_2S_2O_8$ | 0.5 | diisopropyl fumarate | 60 |
| $NaHCO_3$ | 0.12 | | |
| polyvinyl alcohol | 1.0 | | |

EXAMPLE 8

| aqueous phase | parts by weight | organic phase | parts by weight |
|---|---|---|---|
| $H_2O$ | 108.3 | vinyl acetate | 20 |
| Na-dodecyl sulfate | 6.0 | di-n-octyl fumarate | 20 |
| $K_2S_2O_8$ | 0.5 | diisopropyl fumarate | 60 |
| $NaHCO_3$ | 0.8 | | |
| polyvinyl alcohol | 1.0 | | |

EXAMPLE 9

| aqueous phase | parts by weight | organic phase | parts by weight |
|---|---|---|---|
| $H_2O$ | 103.0 | vinyl acetate | 20 |
| Na-dodecyl sulfate | 1.0 | di-n-octyl fumarate | 20 |
| $K_2S_2O_8$ | 0.5 | diisopropyl fumarate | 60 |
| $NaHCO_3$ | 0.8 | | |
| polyvinyl alcohol | 1.0 | | |

| EXAMPLE 10 | (According to German Auslegeschrift DT-AS 1 093 558) | | |
|---|---|---|---|
| aqueous phase | parts by weight | organic phase | parts by weight |
| H₂O | 80 | vinyl acetate | 77 |
| polyoxyalkylene glycol | 5.0* | dibutyl maleinate | 23 |
| KOH | 0.2 | | |
| K₂S₂O₈ | 0.4 | | |

*4.5 parts by weight thereof were added to said monomers.

Mode of operation for Example 10

A mixture of 7.7 parts by weight of vinyl acetate 2.3 parts by weight of dibutyl maleinate, and 0.45 parts by weight of polyoxyalkylene glycol were added to the aqueous phase, which at the beginning contained only 0.5 parts by weight of polyoxyalkylene glycol, and under stirring was maintained for 30 minutes at a temperature ranging between 65° and 70°C. 69.3 parts by weight of vinyl acetate, 20.7 parts by weight of dibutyl maleinate, and 4.05 parts by weight of polyoxyalkylene glycol were then added thereto within 10 hours at constant temperature and maintained for 4 more hours at the reaction temperature.

The reaction product has the properties indicated in Table I. Owing to the high content of monomer residues, the unpigmented film is slightly sticky and its abrasion resistance is not given, although the critical pigment volume concentration (CPVC) of 75 percent is clearly above the pigment volume concentration (PVC) of 60 set for the abrasion test.

The properties of the dispersions obtained according to the Examples and the coatings produced therefrom are illustrated in Table I below. In comparison thereto, the properties of three commercial lacquer resin dispersions and of coatings produced therefrom are also given in Table I.

The gloss was measured according to the method of Lange, that is for 20 percent PVC (pigment volume concentration) with an angle of incidence of 45°. The values mentioned in Table I under "Hardness" are pendulum hardness values according to Koenig (DIN 53 157). To determine the CPVC value (according to IND. Eng. Chem. 41 (1949), page 1470), the dispersion was pigmented with an increasing concentration of $TiO_2$, applied as a film and subsequently coated with a high polish alkyd resin lacquer film of a predeterminate thickness of layer. The gloss value of the alkyd resin lacquer layer which drops abruptly at the critical pigment volume concentration (CPVC) was measured.

The film-forming properties of the unpigmented dispersion were determined when applied to a thickness of 300 microns.

The abrasion resistance was determined according to the TAKD Test Method (Technischer Arbeitskreis Dispersion (Technical Working Group Dispersion), Oct. 2, 1969, Test No. 36). A pigmented film of a (60 percent PVC) having a wet film thickness of 200 microns is scrubbed by a brush having a total weight of about 350 grams, a length of 3 inches, and a width of 1.5 inches. While spraying 1 ml of a 1 percent aqueous solution of sodium dodecylsulfate per minute on the film, the brush is moved to and fro at a speed of 1 cycle per second. The number of cycles is noted at which an area of 1 cm² is scrubbed off in the middle section of the film. More than 5000 cycles have to be resisted for the resin to qualify as "abrasion resistant". Dispersions which barely endure 5000 cycles at 60 percent PVC, are already abrasion resistant at 55 percent PVC.

TABLE I

| product on sale or product acc. to numbered Examples | Properties of Dispersions | | | | | | | |
|---|---|---|---|---|---|---|---|---|
| | Viscosity | Stability | Content of monomer residues | Gloss[2] | Hardness[3] | CPVC | films Film-forming temperature | Abrasion cycles at 60% PVC |
| Vinyl acetate | medium | stable | low | — | 10 | 48 | <<5 | — |
| Acrylate | high | stable | very low | 60 | 36 | 80 | >25 | ~7500 |
| Fumarate | low | stable | low | 40 | 14 | 62 | ~12 | 1000 |
| Example 1 | low | mostly still stable[1] | low | — | 40 | — | >30 | — |
| Example 2 | low | stable | very low | 62 | 35 | 75 | ~13 | ~6000 |
| Example 3 | low | stable | very low | 92 | 31 | — | ~ 7 | — |
| Example 4 | low | stable | very low | 54 | 38 | 75 | ~10 | ~6800 |
| Example 5 | low | stable | very low | 52 | 31 | 70 | ~15 | ~4200 |
| Example 6 | low | stable | very low | 57 | 33 | 75 | ~18 | ~5000 |
| Example 7 | medium | stable | low | 40 | 45 | 75 | 24 | ~7000 |
| Example 8 | medium | stable | low | 40 | 32 | 65 | 14 | ~4500 |
| Example 9 | — | coagulated | — | — | — | — | — | — |
| Example 10 | medium | stable | appr. 15% | 37 | 20 | 75 | 8 | 900 |

[1]Lower limiting value for the dibutoxyethyl fumarate content (DBOF) 10 weight percent based on the total monomer = about 5 mole percent = 8 mole percent based on fumarates, at which generally, a coagulation is not yet occurring.
[2]Gloss according to Lange at 45° reflexion and 20 percent PVC.
[3]Hardness after 7 days: 300µ- unpigmented.

What is claimed is:

1. Dispersion paint consisting essentially of the composition prepared by the aqueous emulsion copolymerization of a monomer mixture consisting essentially of from about 20 to 60 weight percent basis monomers of vinyl acetate and at least 40 to 80 weight percent of a fumaric acid diester selected from the group consisting of:

a. at least one fumaric acid diester of a secondary aliphatic alcohol having from 2 to 8 carbon atoms and at least one fumaric acid diester of an ether alcohol having from 2 to 8 carbon atoms selected from the group consisting of dibutoxyethyl fumarate, diethoxyethyl fumarate, isopropylbutoxyethyl fumarate, and diglycolbutylether fumarate;

b. and a mixture of (a) and a mixed fumaric acid diester of an aliphatic alcohol having from 2 to 8 carbon atoms; wherein the content of said ether alcohol component of said fumaric acid diester is at least 8 mole percent, based on the total amount of fumaric acid diesters.

2. Dispersion paint composition according to claim 1, wherein the said fumaric acid diester of a secondary aliphatic alcohol is diisopropyl fumarate.

* * * * *